United States Patent
Hania et al.

[11] Patent Number: 5,380,997
[45] Date of Patent: Jan. 10, 1995

[54] SMART CARD READER

[75] Inventors: Marc Hania, Paris; René-Claude Ozouf, Le Bourget, both of France

[73] Assignee: Alcatel Radiotelephone, Paris, France

[21] Appl. No.: 80,084

[22] Filed: Jun. 21, 1993

[30] Foreign Application Priority Data

Jun. 22, 1992 [FR] France ............... 92 07575

[51] Int. Cl.⁶ ............... G06K 13/063; H01R 13/62
[52] U.S. Cl. ............... 235/485; 235/483; 235/482; 235/441; 439/325
[58] Field of Search ............... 235/482, 483, 441, 485, 235/486; 439/59, 64, 326, 636, 67, 68, 76, 325; 360/2

[56] References Cited

U.S. PATENT DOCUMENTS

| | | | |
|---|---|---|---|
| 4,009,492 | 2/1977 | Kihara et al. | 360/2 X |
| 4,279,459 | 7/1981 | Sherman | 439/325 |
| 4,700,840 | 10/1987 | Haddock | 360/2 X |
| 4,806,744 | 2/1989 | Briane et al. | 360/2 X |
| 4,864,116 | 9/1989 | Banjo et al. | 235/441 X |
| 4,900,908 | 2/1990 | Tsutsui | 360/2 X |
| 4,918,299 | 4/1990 | Ohmori | 360/2 X |
| 4,931,991 | 6/1990 | Cvijanovich | 235/441 X |
| 5,231,274 | 7/1993 | Reynier et al. | 439/64 |

FOREIGN PATENT DOCUMENTS

| | | |
|---|---|---|
| 0213041 | 3/1987 | European Pat. Off. |
| 2198595 | 6/1988 | United Kingdom |

*Primary Examiner*—Donald Hajec
*Assistant Examiner*—Jeffrey R. Filipek
*Attorney, Agent, or Firm*—Sughrue, Mion, Zinn, Macpeak & Seas

[57] ABSTRACT

Resilient wipers (4a, 4b) cooperate with inclined planes (13a, 13b) to maintain the card (7) constantly parallel to the base part (1) of the card reader during the introduction of the card into the reading compartment (12). The free ends of the wipers (4a, 4b) are biased into a plane further from that of the base part (1) than that which the free ends of the reading wipers (3a, 3b) tend to assume. This device is simple and compact and makes it possible to eliminate static electricity created by the card rubbing against the card reader.

4 Claims, 2 Drawing Sheets

SMART CARD READER

BACKGROUND OF THE INVENTION

The present invention concerns a smart card reader. The invention is more particularly concerned with a smart card reader comprising a compartment with an aperture for the introduction of the card, this being held in a holder placed at the end opposite to that which is introduced into the said aperture, at least one reading wiper carried by a base part of insulating material forming at least a part of one wall of said compartment, and means for placing the card in a reading position in which the said wiper is in contact with at least one operative region of the card.

There already exist devices of this kind but they have some defects. In particular the smart card readers in accordance with known technical solutions comprise a large number of mechanical parts, especially to implement the means enabling the card to be brought into its reading position, which involves a relatively high cost price as well as the risk of breakdown, furthermore increasing the size of the apparatus. On the other hand, the known devices do not comprise means enabling the static electricity created by the card rubbing against certain parts of the reader to be eliminated.

SUMMARY OF THE INVENTION

An object of the invention is thus to overcome or ameliorate the problems of the prior art devices, in particular by providing a simple and compact device enabling static electricity to be eliminated.

To this end the card reader according to the invention is characterized in that said means for placing the card in a reading position are formed by two inclined planes (13a, 13b) parallel to each other, formed on the surface of a wall (13) of said compartment (12) facing the said base part (1), and by at least one resilient wiper (4a, 4b) of which one end is fixed to the base part (1) and of which the other end is free and is biased into a plane further from that of the base part (1) than that which the free ends of the said reading wipers (3a, 3b) tend to assume, the said resilient wiper (4a, 4b) tending to apply the card against the said wall (13) and cooperating with the said inclined planes (13a, 13b) to maintain the card, placed in a holder (8), constantly parallel to the base part (1).

The invention will be better understood from the detailed description which follows of a particular implementation of the card reader, this description being given by way of non-limiting example and referring to the accompanying drawings, in which:

DESCRIPTION OF THE PREFERRED EMBODIMENT

Figure 1:
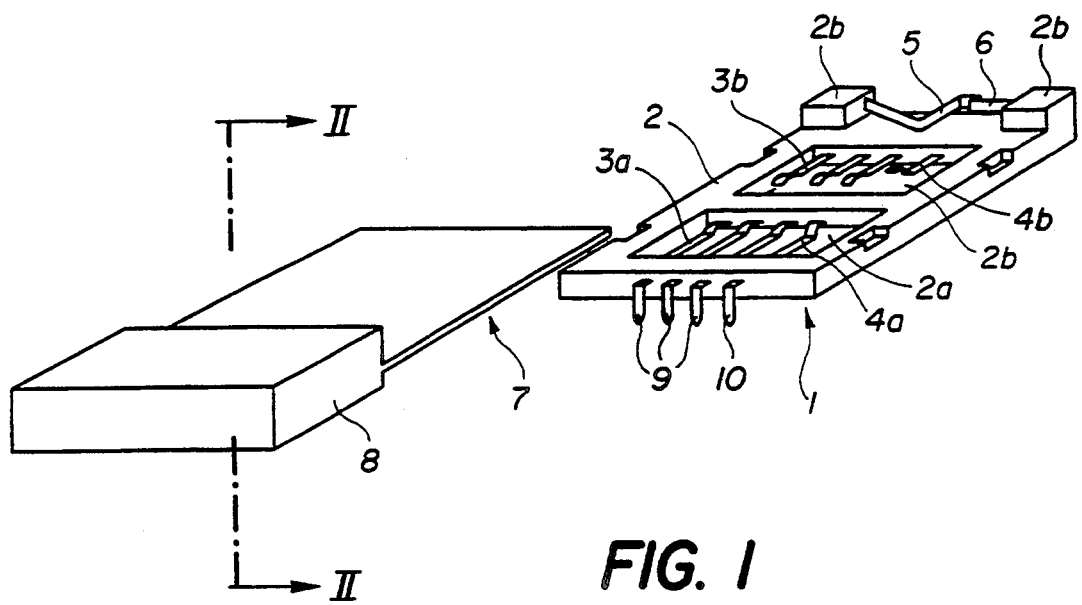
FIG. 1 is a schematic perspective view of a base part forming part of the card reader of the invention, this view also showing the relative position of a smart card put into a card holder relative to the base part, during the engagement of the card in the reader.

As is seen in FIG. 1, the base part 1 is formed by a plate 2 of insulating material, having two recesses 2a and 2b of identical shape located in symmetrical positions relative to the central part of the plate 2.

First and second groups of reading wipers 3a and 3b formed by resilient metal tongues, each group comprising three identical wipers, are disposed parallel to one another in the recess 2a and the recess 2b respectively, the free ends of these wipers being bent back to serve as electric contact members on the smart card 7 and being biased to assume a plane located a little above that of the upper surface of the plate 2.

Two wipers 4a, 4b, similar to the reading wipers 3a and 3b, are also located in the recesses 2a and 2b respectively, in the same manner as the reading wipers 3a and 3b but with their free ends, which are also bent back to serve as contact members for the card 7, biased to assume a plane located in a position a little above that which the free ends of the reading wipers 3a and 3b tend to assume. The wipers 4a and 4b are thus called "raised wipers" in the rest of the description. The other ends of the reading wipers 3a and 3b, as well as those of the raised wipers 4a and 4b are held in the opposite edges of the recesses 2a and 2b, as illustrated in FIG. 1, and they are continued by respective conductive pins 9 and 10, projecting outside the plate 2, these pins being designed to be connected to electrical conductors connecting the base part 1 of the reader to other parts and apparatus. The pins 9 correspond to the reading wipers 3a and 3b and the pins 10 to the raised wipers 4a and 4b.

Figure 2A:
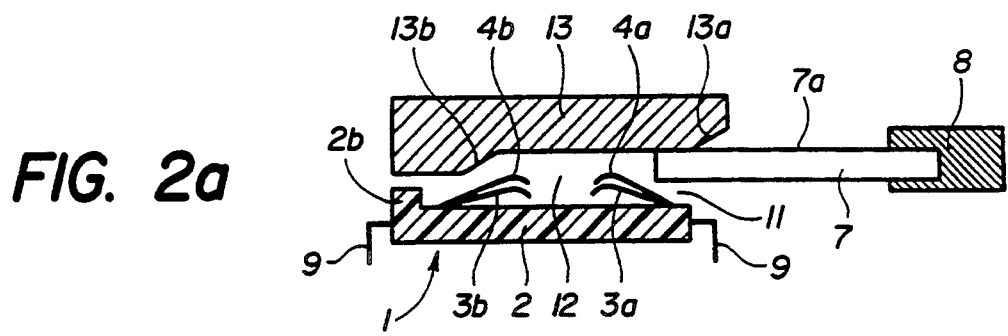
FIGS. 2(a) to 2(f) show the relative position of the card and its holder in relation to the card reader, for the embodiment shown in FIG. 1 and in schematic section on the plane II—II indicated in FIG. 1, in six successive stages respectively during positioning of the card for reading.

The plate 2 is advantageously arranged horizontally, as shown in FIG. 1, and the card, held in a card holder 8, is likewise placed horizontally during its engagement in the inner compartment 12 (FIG. 2(a)) of the reader.

Figure 2B:
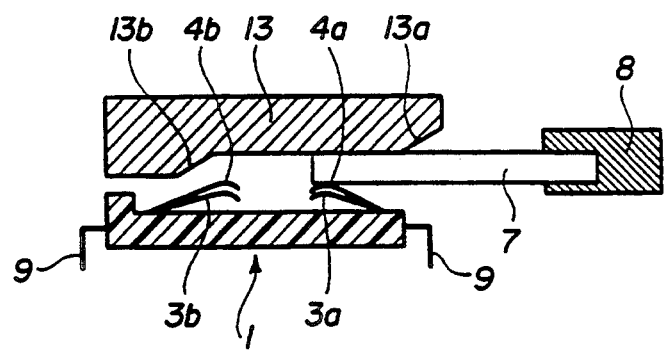
Figure 2C:
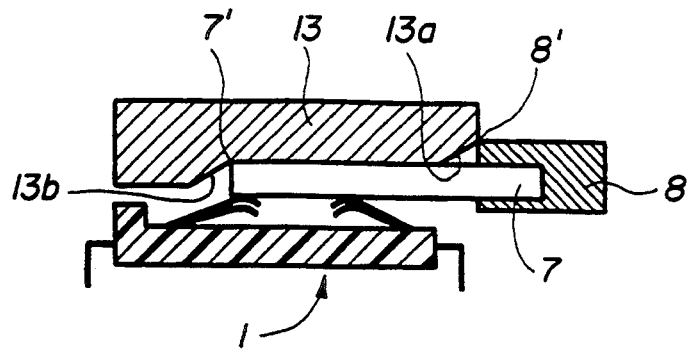
Figure 2D:
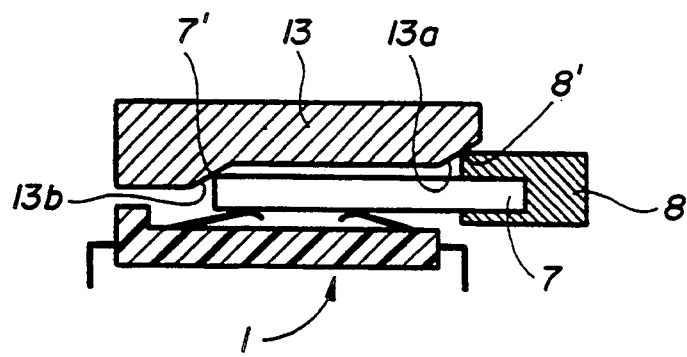
Figure 2E:
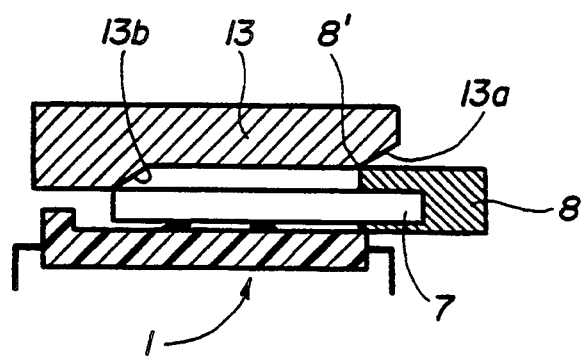
Figure 2F:
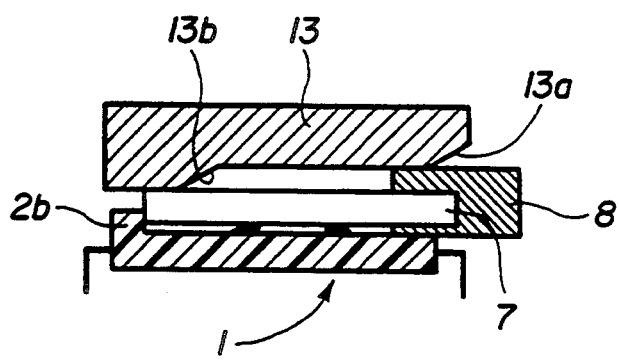

The rear part of the plate 2 carries blocks 2b which serve as stops for the plate 8 (see FIG. 2(f)) and also serve to support resilient tongues 5 and 6, of which the former is bent in the shape of a knee facing the front, these two tongues cooperating to form an end-of-stroke limit switch for the card in a manner which appears clearly from the simple view of their disposition as illustrated in FIG. 1.

In the position shown in FIG. 2(a), which corresponds to engagement in the reader of the card 7 held in its holder 8, the front end of the card 7 penetrates slightly into the aperture 11 of the inner compartment 12 of the reader. This compartment 12 is bounded by the base part 1 and a plate 13 which forms the upper wall of the inner compartment 12 of the reader, facing the plate 2. The plate 13, which is as a whole spaced from the plate 2 and more especially from the card 7, comprises two parts of different thicknesses, of which the thicker part is located at the rear end of the compartment 12 and the thinner part extends from the end of this compartment at which the aperture 11 opens out up to near the rear end of the compartment 12.

These two parts of the plate 13 are connected by a surface 13b which forms an obliquely inclined plane and the front face of the plate 13 extending from the aperture 11 forms another plane surface 13a, likewise forming an inclined plane parallel to the plane 13b.

As is seen in FIG. 2(a), the card 7 is so presented that its front edge can be guided by the wall 13a during the engagement of the card in the aperture 11 and that the upper face 7a of the card 7 will then be applied against the lower surface of the wall 13.

In the following stage, illustrated in FIG. 2(b), the card 7 comes into contact with the raised wiper 4a which applies it against the lower surface of the wall 13, which allows removal of any static electricity that may be on the card 7 by discharge of electrostatic charge to ground. It is noted that the wipers 4a and 4b are so positioned as to rub against non-functional bands of the card 7. In this state, the card 7 does not yet come into contact with any of the reading wipers 3b and 3a.

In the following stage, illustrated in FIG. 2(c), the card 7 is inserted to the point at which its front edge 7″ reaches just to the start of the surface 13b, which forms a ramp to guide the card down. In this state the card is also in contact with the second raised wiper 4b but it is still not in contact with the reading wipers 3a and 3b.

As will be seen, in this same state, the front, upper edge 8′ of the card holder 8 has just reached the start of the surface 13a, which forms a ramp to guide the card holder 8 down in the direction of the upper face of the plate 2 of the base part 1.

In the stage illustrated in FIG. 2(d), the front edge 7′ of the card 7 is engaged on the ramp 13b and the front edge 8′ of the card holder 8 is engaged on the ramp 13a. It is noted that the dimensions of the card 7, of the holder 8 and of the plate 13 (which comprises the ramps 13a and 13b) are such that, because of the parallelism of the two ramps, when the plate 7 is pushed towards the bottom of the compartment 12, it approaches the upper surface of the plate 2 while remaining always parallel thereto.

In this movement, the card moves away from the lower wall of the plate 13, which is parallel to the plate 2.

In the stage illustrated in FIG. 2(e), the front edge 7′ of the card 7 just reaches the end of the ramp 13b and it is on the point of engaging beneath the part of maximum thickness of the plate 13.

The front edge 8′ of the card holder 8 likewise just reaches the region of the end of the ramp 13a and it is on the point of engaging beneath the part of minimum thickness of the plate 13.

This state corresponds to the start of contact of the lower surface of the card 7 with the operative wipers 3a and 3b, the raised wipers 4a and 4b obviously being pressed down to the same level as the operative wipers 3a and 3b.

In the final stage illustrated in FIG. 2(f), the card 7 has reached the end of its travel in the compartment 12 and it abuts the blocks 2b, opening the limit switch 5, 6 (FIG. 1).

The card holder 8 then comes to bear against the lower surface of the plate 13 and the card 7 is in its reading position.

Obviously, as is clear from FIGS. 2(a) to 2(f), during the withdrawal of the card 7 out of the reading compartment 12, the same positions as have been described are reached in reverse order.

The card reader of the invention is particularly light and small in size and it is particularly suitable for fitting in portable devices, especially radio-telephone apparatus using smart micro-cards.

What is claimed is:

1. A smart card reader assembly comprising a compartment with an aperture for the introduction of a card and at least one reading wiper carried by a base part of insulating material forming at least a part of one wall of said compartment, as well as means for placing the card in a reading position in which a free end of said wiper is in contact with at least one operative region of the card, characterized in that, the card (7) being provided with a holder (8) at its end remote from that which is introduced into said aperture, said means for placing the card in a reading position are formed by two inclined planes (13a, 13b) parallel to each other, formed on the surface of a second wall (13) of said compartment (12) facing said base part (1), and by at least one resilient wiper (4a, 4b) of which one end is fixed to the base part (1) and of which the other end is free and is biased into a plane further from that of the base part (1) than that which the free end of said reading wiper (3a, 3b) tends to assume said resilient wiper (4a, 4b) tending to apply said card against said second wall (13) and cooperating with said inclined planes (13a, 13b) to maintain the card constantly parallel to the base part (1).

2. The smart card reader assembly as defined in claim 1, further comprising said card (7) provided with said holder (8).

3. The smart card reader assembly as defined in claim 2, wherein said second wall (13) and said resilient wiper (4a, 4b) cooperate in order discharge to ground any electrostatic charge on said card when said card is applied against said second wall (13).

4. The smart card reader assembly as defined in claim 2, wherein said aperture is in a card-insertion first end of said compartment which also has a second end that is located in a direction opposite to said first end, wherein said resilient wiper is located at said first end of said compartment, and wherein said reader wiper is spaced in said direction from said resilient wiper, so that said card is not placed in said reading position until said card has been applied against said second wall (13).

* * * * *